Dec. 30, 1969  C. A. REAMS  3,486,715

HELICOPTER WING DEVICE IN COMBINATION WITH FIXED WING AIRCRAFT

Filed Feb. 8, 1967

INVENTOR
CLINTON A. REAMS

BY

ATTORNEY

United States Patent Office 3,486,715
Patented Dec. 30, 1969

3,486,715
HELICOPTER WING DEVICE IN COMBINATION WITH FIXED WING AIRCRAFT
Clinton August Reams, Dearborn, Mich.
(P.O. Box 7734, Washington, D.C. 20044)
Filed Feb. 8, 1967, Ser. No. 614,725
Int. Cl. B64d 5/00
U.S. Cl. 244—2
4 Claims

ABSTRACT OF THE DISCLOSURE

An airborne device known as a helicopter wing device in combination with fixed wing aircraft, said helicopter wing device having rotor mounted on a vertical shaft that consists of internal parts described in U.S. Patent No. 3,314,483; the means of handling aboard and in flight down through an extendable launching tube and shielding therefor, rest lugs arranged to drop the helicopter wing device to thereby provide flight delivery to the destinations needing service of supply of heavier loads, or those critical such as medical supplies and personnel under direct or remote control devices to suit needs of user.

---

This invention relates to a new helicopter wing device particularly to the more rapid transport by fixed wing aircraft in conjunction with my device of personnel and critical items to terral sites where there are no landing facilities for aircraft to make delivery, to distressed areas, and to the military in field operations and for similar uses.

Part I.—Launching means

There exists a need to provide means for the delivery of men and materials to spots where a military rendezvous is contemplated or where a large construction project can be best served by fast on-the-spot delivery required in terrain where there is no landing field in the usual inaccessible locations. Heretofore, this has not been possible to do because of the hazard and likely loss of critical items such as medical supplies, food for a disaster area, ammunitions for military, military personnel, food items subject to spoilage, special mail items, etc. Utilizing my helicopter wing device in conjunction with a high speed fixed wing aircraft equipped with a launching tube means for same is this element of my invention; hence it is possible to provide this heretofore non-existent service by use of heavy air transport planes as well.

The inventor has sought to provide a more practical drop means in this amended application without possibility of an air lock in the launch tube that might lead to disastrous consequences. Eliminated is the free-drop to start the turbine engine, it being safer practice to start the turbine engine in order to have the rotor system of my device functioning well before the drop is made to also assure the operative function of the rudder on my helicopter wing device so that direction is assured at the time of release from the downpending launching tube, particularly when it is desired to tow one or two helicopter wing devices from the fixed wing aircraft after launching preparatory to drop.

There exist several applications of my device for load carrying; in all instances the load is carried below the vertical shaft mounted rotatable rotor system along with the turbine engine integrally mounted in the cargo carrying or personnel carrying body pan-shaped as hereafter described. It is further anticipated that other forms may be adopted, in each instance keeping the center of gravity below the rotor system to preserve stability in flight.

Having set forth the pertinent facts relative to this element of my invention, it consists of the arrangement embodied in this part in relation to the general application and construction. In describing the drawings of the launch method and means from a fixed wing aircraft and the related parts:

In referring to the drawings as herein set forth, like reference characters indicate like parts for ease in identification.

Figure 1:
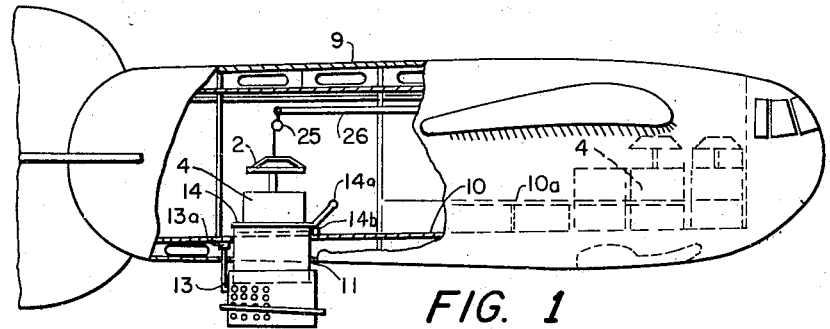
FIGURE 1 represents a longitudinal section of a high speed fixed wing cargo carrying airplane that serves to illustrate the application of my helicopter wing device with relation to the launching operation through its appended launching tube and incorporating a side view of it in down position for launch.
Figure 7:
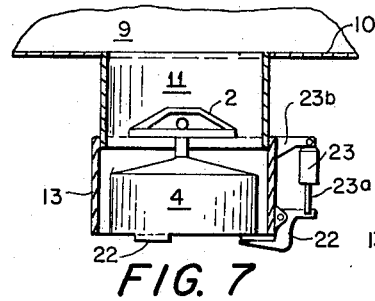
FIGURE 7 shows a side sectional view of launching tube to illustrate how the helicopter wing device is lowered from rest-position "ready," in FIGURE 2 above, with hoist on the axial center of launching tube with trolley monorail above with attached hook to engage lifting eye of the rotor system, integral with hub attached to vertical axial shaft of the helicopter wing device.

FIGURE 1 shows the arrangement for the stowage of the helicopter wing devices on the floor 10 of the fixed wing aircraft 9 and on tiered racks 10a along the side of its fuselage, arranged on same and removable by means of monorail hoist 25 with hook 26b running on monorail 26 and supported by trolley 25a, shown in detail in FIGURE 7. Besides the handling feature on board of the aircraft, the launching tube mounted in the center of the floor aft of the fuselage is the hatch ring secured to the floor 10 and the space around the periphery in which is nested the outer hatch ring 13 when in flight. This serves as deflector of high velocity air currents along the outer surface of the aircraft 9, the holes 13b dissipating the pressure build up in the hatch 13 opening when in flight at time of launch of the helicopter wing device 2 with its appended cargo carrying pod attached to vertical axial shaft 1. At floor level around hatch 11 is steady frame 14 with valve 14a and actuator 14b thereon. Hatch ring 13 is actuated by hydraulic mechanism 13a.

Figure 2:
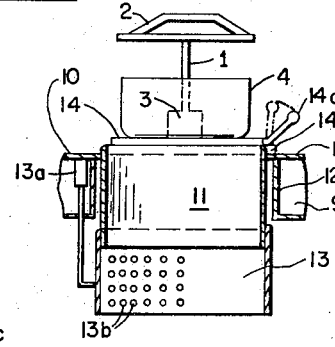
FIGURE 2 represents a side elevation of my helicopter wing device held in position of "ready" and above the launching tube before lowering.
Figure 6:
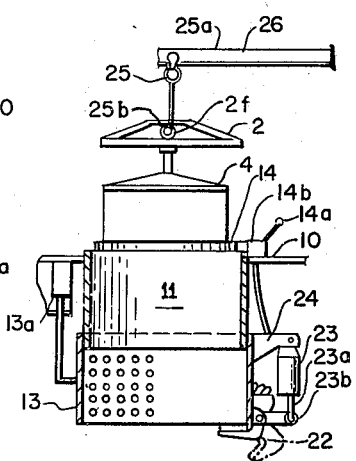
FIGURE 6 shows a cutaway sectional view of the launching tube, the upper wing of same downpending and outer hatch element in down position with the operating parts thereto supporting the helicopter wing device before lowering for final launch is made.

FIGURE 2 shows an enlarged sectional view of the hatches 11 and 13 downpending with the helicopter wing device 2 at "ready" position to lower (lift truck 14 omitted as hazardous to personnel) with the valve 14b and release mechanism integral at floor 10 level, ready for lowering as in FIGURE 6.

Figure 3:
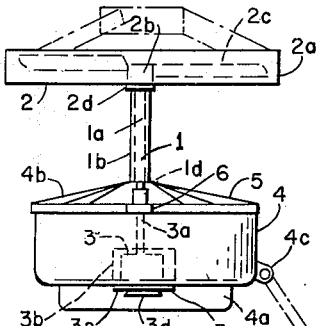
FIGURE 3 represents a cargo carrying application of my helicopter wing device side view.

FIGURE 3 shows a side view of the helicopter winged device in the original form on which my invention was predicated with the primary integral parts: bladed rotor 2 with blades 2c radiating from hub 2b with peripheral shroud ring 2a. Secondary blades 2d are supported by an inner ring to form a secondary ring, the primary and secondary providing a rotor system to better sustain flight.

Below the cover 4b and attached to vertical rotor shaft 1a is a conventional torque slip coupling 1d. At starting of the turbine engine 3, this coupling 1d absorbs the instant torque and shear effect upon parts due to the high speed starting, insuring the steady pick up in speed of the rotor system 2. A like condition may be evident when the helicopter wing device is started from flight.

On the bottom of the cargo carrying pod 4 and in recess 3b is secured the turbine engine 3. On the horizontal center line of the cargo carrying pod 4 and beneath are fixed two parallel flange metal channels. Located and positioned on the bottom and on a common center is turbine exhaust pipe 3c attached to a horizontal flared metal exhaust cone 3d, between the toed-in flanged channels 4a, the function of which is to maintain directional control during flight.

Figure 4:
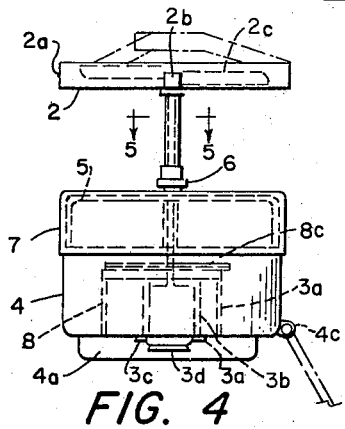
FIGURE 4 shows a side view of my helicopter wing device with parts necessary to accommodate the carrying of personnel.

FIGURE 4 is a side view of my device as a personnel cargo carrying pod 4 attached to the rotor system 2, hub 2b attached with cover 2a, thrust bearing 6 is above clear round plastic dome 7 and supported by arbor 5 framed beneath, as protection against weather. Seating is cluster-arranged over the turbine engine 3, enclosure 3a in seats 8 and 8a, dividers 8b around cover 3b. The ring 4c is for retrieval line attachment, 3e indicates controls for the device in flight.

Figure 5:
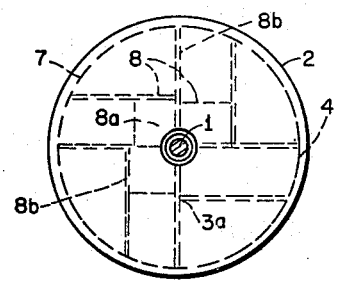
FIGURE 5 shows a plan view of the cargo carrying pan shaped pod and cluster seating of personnel and their gear.

FIGURE 5 is a plan view of the cargo personnel carrying pod 4 with seating and dividers and parts as in FIGURE 4 above.

FIGURE 6 shows a cutaway sectional view to illustrate how the cargo carrying pod 4 of the helicopter wing device 2 is lowered from position "ready," in FIGURE 2 above, by means of hoist 25 with hook 25b from trolley 25a by means of lift eye 2f integral with the rotor hub 2b and with the cargo carrying pod 4 both connected by the rotatable vertical axial shaft 1 having an outer fixed sleeve 1b.

FIGURE 7 shows a side sectional view of the launching tube upper ring 11 inside the outer collapsible ring hatch 13 indicated in down position. The cargo-carrying pod of the device rests upon the lower lugs 22 actuated by hydraulic cylinders 23 pivoted upon pins 22a on brackets 24 and attached to hatch 13 at 120° center. To launch, the hydraulic valve 14b causes the lugs to travel in arcuate path back to a position suitable to support another device for launching from the launching tube 13.

Figure 8:
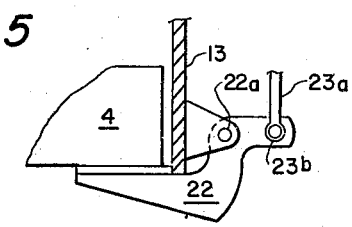
FIGURE 8 illustrates the enlarged portion in a sectional view of the lower part of the launching tube and the integral parts fitted to same to provide preferred means to launch the helicopter wing device.

FIGURE 8 shows an enlarged part sectional view of the lower part of launching tube 13 of which it is shown with lugs 22 to support the cargo carrying pod 4 with pistons 23a and pins 23b connected to hydraulic valves 14b and pins 22a pivots for lower lugs 22.

Part II.—Helicopter wing device, drop pod element

In Part I of this application, description has been made of this principal element of my invention, the helicopter wing device adapted to be dropped from a fixed wing aircraft in flight. This drop pod element is composed of several parts: a rotor system to sustain flight to location after the drop is made and after landing to return to base. Mounted on a vertical rotatable shaft the axis of which is the center for the coupling, the round pan-shaped cargo carrier has in its bottom integrally mounted a turbine engine between two parallel rudder-like rest-members upon which the helicopter wing device can land—or sit on a level surface, where it is not possible to land fixed wing aircraft.

This device can be adapted to the transport of supplies, food and many critical items for the use of the military for a protective cover is provided over the otherwise open top. Personnel, four shown, can be protected over the top of the cargo carrying pod by a plastic bubble canopy and seats to fit in cluster arrangement. Small in size, these small helicopter wing devices dropped in groups, or sent in "waves," would provide an element of surprise in attack or in making secure a terral situated position by the military in foreign campaigns. American Red Cross considered this to be of value in disaster relief. The Post Office Department can make mail drops between principal cities with this device. Interior can fight forest fires in terral locations.

In the delivery and spotting of these helicopter wing devices to locations on the terrain, it is anticipated that a plotting method can be provided by radar or similar means and their return by a homing method provided by the military. Also, after the helicopter winged device is drop launched from the fixed wing aircraft, as previously described, it is possible to affix a tow-line to the metal fitting provided on the metal cargo carrier body, same not to be towed by means of a taut line from the aircraft. By this method, it is possible to bring by towing one or several helicopter wing devices at or over a ground site without releasing if the conditions are unfavorable for landing at the terral destination. By this means it is possible to tow certain devices where such application is found to be desirable and field conditions favorable.

Translational flight in my device is accomplished by the improved rotor system in combination with the turbine engine exhaust into the cone and orifice ring that induces an air current stream between the toed-in channels on the bottom of the cargo-carrying pan-shaped pod in shape to produce a modified jet stream effect to give the device direction as well. Modification of the speed of the rotor system can also cause the helicopter wing device to change direction and/or course to insure better directional control by correction in this manner.

Further, my invention consists in the arrangement embodied in drawings each applicable to the uses in relation to application and construction, and in the claims set forth.

Having described this separate element of the stowage and launching of my helicopter wing device in combination with a fixed wing aircraft arranged therefore, its use and application, I claim:

1. In combination, a fixed wing aircraft having a fuselage floor, a helicopter wing device, an extendable launching tube mounted in said floor adapted to receive said helicopter wing device, said tube comprising an inner hatch ring mounted in said floor and an outer ring fitted over and slidable on the outer periphery of said inner ring and extendable downwardly to protrude beyond the skin of said fixed wing aircraft, and evenly spaced lugs pivoted to said outer ring adapted to support said helicopter device coaxially within said lauching tube.

2. A launching tube as described in claim 1, said evenly spaced pivoted lugs mounted in a horizontal plane on the outer periphery of the outer ring, said lugs being held in a horizontal position as a seat for said helicopter wing device by an hydraulic cylinder actuator arranged to actuate the pivoted lugs, said actuator simultaneously operating said lugs to drop the helicopter wing device in launch operation.

3. The combination of claim 1, rack storage means in said fixed wing aircraft to support helicopter wing devices, a trolley hoist handling system attached to the fuselage structure of said fixed wing aircraft to dispose the helicopter wing devices on said storage means and to lift and carry said helicopter wing devices to said launching tube and to lower said helicopter wing devices in said launching tube.

4. A launching tube as described in claim 3, an integral cargo carrying pod designated as a drop pod element connected to a rotatable axial shaft, said shaft depending from a rotor with attached torque slip coupling, an arbor axially supporting a top edge of the cargo carrying pod with a connected turbine motor located in a recess in the cargo carrying pod, parallel channel metal flanges on the bottom of said pod, a horizontal turbine exhaust pipe located between said parallel channels, said turbine exhaust pipe arranged to discharge through the center of a horizontal exhaust cone centrally mounted to give direction to the helicopter wing device after launching, thereby to insure its reaching its destination.

References Cited

UNITED STATES PATENTS

| | | | |
|---|---|---|---|
| 1,964,016 | 6/1934 | Wiley | 244—138 |
| 2,029,778 | 2/1936 | Krammer | 244—2 |
| 2,365,827 | 12/1944 | Liebert | 244—2 |
| 2,389,160 | 11/1945 | Manson et al. | 244—137 |
| 2,404,195 | 7/1946 | Schlieben | 244—118 X |
| 2,639,106 | 5/1953 | Sesera | 244—137 X |
| 2,913,198 | 11/1959 | Bonbrake | 244—137 |
| 2,966,318 | 12/1960 | Chodan | 244—23 |

MILTON BUCHLER, Primary Examiner

J. L. FORMAN, Assistant Examiner

U.S. Cl. X.R.

244—17.11, 118, 137, 138